(12) United States Patent
Von Novak et al.

(10) Patent No.: US 9,912,177 B2
(45) Date of Patent: Mar. 6, 2018

(54) SINGLE TRANSFORMER HIGH-POWER BALANCER

(71) Applicant: QUALCOMM Incorporated, San Diego, CA (US)

(72) Inventors: William Henry Von Novak, San Diego, CA (US); Linda Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/185,323

(22) Filed: Jun. 17, 2016

(65) Prior Publication Data

US 2017/0366018 A1    Dec. 21, 2017

(51) Int. Cl.
*H02J 7/00*        (2006.01)
*B60L 11/18*      (2006.01)
*G01R 31/36*     (2006.01)

(52) U.S. Cl.
CPC ......... *H02J 7/0014* (2013.01); *B60L 11/1866* (2013.01); *G01R 31/362* (2013.01)

(58) Field of Classification Search
CPC ... H02J 7/0014; B50L 11/1866; G01R 31/362
USPC ....................................................... 320/118
See application file for complete search history.

(56) References Cited

U.S. PATENT DOCUMENTS

| | | | |
|---|---|---|---|
| 6,873,134 B2 | 3/2005 | Canter et al. | |
| 8,294,421 B2 | 10/2012 | Bucur et al. | |
| 8,541,979 B2* | 9/2013 | Firehammer | H02J 7/0014 320/107 |
| 8,773,071 B2 | 7/2014 | Martinelli | |
| 9,620,968 B2* | 4/2017 | Sugeno | H01M 10/441 |
| 9,667,073 B2* | 5/2017 | Wu | H02J 7/0014 |
| 2006/0097698 A1* | 5/2006 | Plett | H02J 7/0014 320/118 |
| 2011/0140663 A1 | 6/2011 | Tofigh et al. | |
| 2013/0099746 A1* | 4/2013 | Nork | B60L 11/1866 320/118 |
| 2014/0145670 A1 | 5/2014 | Van et al. | |
| 2015/0311736 A1* | 10/2015 | Park | H02J 7/0054 320/104 |
| 2016/0049810 A1* | 2/2016 | Armstrong, II | H02J 7/0014 320/118 |
| 2016/0064969 A1* | 3/2016 | Pernyeszi | H02J 7/0014 320/118 |
| 2016/0094063 A1* | 3/2016 | Wu | H02J 7/0019 320/112 |

(Continued)

*Primary Examiner* — Stacy Whitmore
(74) *Attorney, Agent, or Firm* — Patterson & Sheridan, L.L.P.

(57) ABSTRACT

Certain aspects of the present disclosure provide apparatus and methods for balancing charge in a plurality of cells in a battery. In one example apparatus, the primary winding of the transformer may be coupled to a bus, and the secondary winding may be coupled to a cell of the plurality of cells in the battery. The apparatus also includes a switch coupled to the primary winding of the transformer and one or more control circuits coupled to the switch. The control circuit may be configured to control the first switch based on a voltage at a first terminal of the primary winding to control transfer of power between the cell and the bus via the transformer.

28 Claims, 9 Drawing Sheets

(56) References Cited

U.S. PATENT DOCUMENTS

2016/0197498 A1* 7/2016 Mercier ............... H02J 7/0018
                                                    320/118
2017/0033700 A1* 2/2017 Ishigaki ............... H02J 7/0016
2017/0141586 A1* 5/2017 Pernyeszi ............... H02J 7/007

* cited by examiner

SINGLE TRANSFORMER HIGH-POWER BALANCER

TECHNICAL FIELD

Certain aspects of the present disclosure generally relate to electronic circuits and, more particularly, to a battery cell balancing circuit.

BACKGROUND

Batteries containing multiple cells are common in electric vehicle (EV) and smart-grid systems. Smart-grid systems may contain battery energy storage systems (BESS) to provide backup power during utility power loss, local storage to supply power at night for non-net-metering areas, and load-shifting services to save money in real time pricing scenarios. The costs of these systems are related to how long the battery lasts, since battery replacement can be a major contributing factor to the cost in such systems. Moreover, EVs use large battery storage systems for power. Increasing the energy that can be consumed with a single charge of the battery pack is key for manufacturers wishing to provide a vehicle with a competitive driving range.

SUMMARY

Certain aspects of the present disclosure generally relate to balancing charge in a plurality of cells in a battery.

Certain aspects of the present disclosure provide an apparatus for balancing charge in a plurality of cells in a battery. The apparatus generally includes a transformer comprising a primary winding and a secondary winding, the primary winding of the transformer being coupled to an interface for coupling to a bus, and the secondary winding being coupled to another interface for coupling to a cell of the plurality of cells in the battery, a first switch coupled to the primary winding of the transformer, and one or more control circuits coupled to the first switch and configured to control the first switch based on the sensed voltage at a first terminal of the primary winding to control transfer of power between the other interface for coupling to the cell and the interface for coupling to the bus via the transformer.

Certain aspects of the present disclosure provide a method for balancing charge in a plurality of cells in a battery. The method generally includes sensing a voltage at a first terminal of a primary winding of a transformer, wherein the primary winding of the transformer is coupled to an interface for coupling to a bus, wherein a secondary winding of the transformer is coupled to another interface for coupling to a cell of the plurality of cells in the battery, and wherein the sensed voltage at the first terminal is representative of a voltage of the cell, and operating a first switch coupled to the primary winding based on the sensed voltage to control transfer of power between the other interface for coupling to the cell and the interface for coupling to the bus via the transformer.

Certain aspects of the present disclosure provide an apparatus for balancing charge in a plurality of cells in a battery. The apparatus generally includes a transformer comprising a primary winding and a secondary winding, the primary winding of the transformer being coupled to an interface for coupling to a bus, and the secondary winding being coupled to another interface for coupling to a cell of the plurality of cells in the battery, a first switch coupled to the secondary winding of the transformer, and a control circuit configured to sense a voltage at a first terminal of the secondary winding representative of a voltage of the bus, and control the first switch based on the sensed voltage at the first terminal of the secondary winding to control transfer of power between the other interface for coupling to the cell and the interface for coupling to the bus via the transformer.

Certain aspects of the present disclosure provide a method for balancing charge in a plurality of cells in a battery. The method generally includes sensing a voltage at a first terminal of a secondary winding of a transformer, wherein a primary winding of the transformer is coupled to an interface for coupling to a bus, wherein the secondary winding of the transformer is coupled to another interface for coupling to a cell of the plurality of cells in the battery, and wherein the sensed voltage at the first terminal of the secondary winding is representative of a voltage of the bus, and operating a switch coupled to the secondary winding based on the sensed voltage at the first terminal of the secondary winding to control transfer of power between the other interface for coupling to the cell and the interface for coupling to the bus via the transformer.

Certain aspects of the present disclosure provide a system for balancing charge in a plurality of cells in a battery. The system generally includes a plurality of transformers, each comprising a primary winding and a secondary winding, wherein each of the primary windings is coupled to an interface for coupling to a bus and wherein each of the secondary windings is coupled to another interface for coupling to one of the plurality of cells, a plurality of switches, wherein each of the primary windings is coupled to one of the plurality of switches, and at least one control circuit coupled to the plurality of switches and configured to control the plurality of switches based on one or more voltages at a first terminal of the primary winding to control transfer of power between the other interfaces for coupling to the plurality of cells and the interfaces for coupling to the bus.

Certain aspects of the present disclosure provide an apparatus for balancing charge in a plurality of cells in a battery. The apparatus generally includes means for sensing a voltage at a first terminal of a primary winding of a transformer, wherein the primary winding of the transformer is coupled to an interface for coupling to a bus, wherein a secondary winding of the transformer is coupled to another interface for coupling to a cell of the plurality of cells in the battery, and wherein the sensed voltage at the first terminal is representative of a voltage of the cell, and means for operating a first switch coupled to the primary winding based on the sensed voltage to control transfer of power between the other interface for coupling to the cell and the interface for coupling to the bus via the transformer.

Certain aspects of the present disclosure provide an apparatus for balancing charge in a plurality of cells in a battery. The apparatus generally includes means for sensing a voltage at a first terminal of a secondary winding of a transformer, wherein a primary winding of the transformer is coupled to an interface for coupling to a bus, wherein the secondary winding of the transformer is coupled to another interface for coupling to a cell of the plurality of cells in the battery, and wherein the sensed voltage at the first terminal of the secondary winding is representative of a voltage of the bus, and means for operating a switch coupled to the secondary winding based on the sensed voltage at the first terminal of the secondary winding to control transfer of power between the other interface for coupling to the cell and the interface for coupling to the bus via the transformer.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
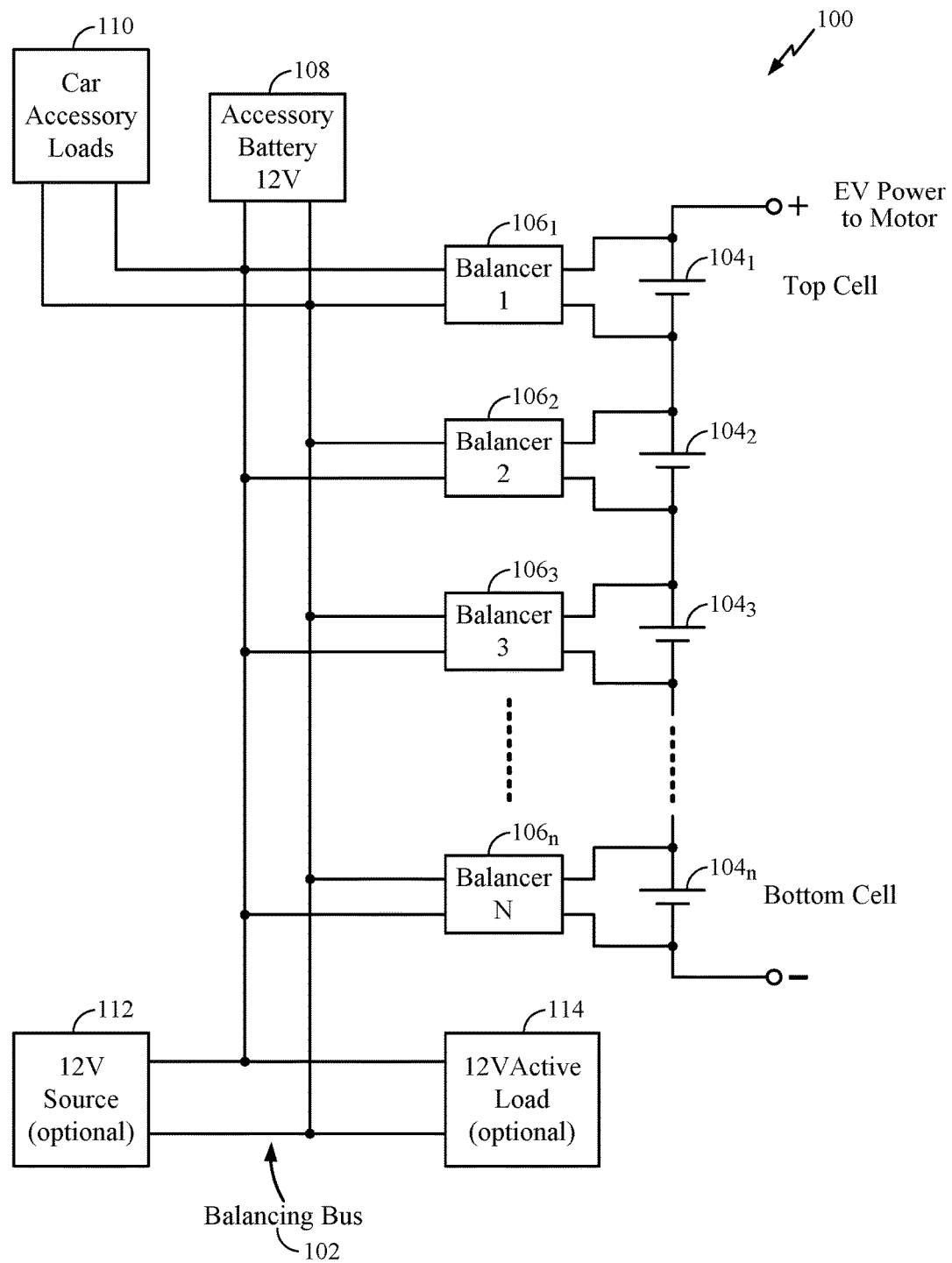
FIG. 1 illustrates a block diagram of an example battery cell balancing system, in accordance with certain aspects of the present disclosure.

Certain aspects of the present disclosure provide techniques and apparatus for balancing cells in a battery using a transformer. Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Certain aspects of the present disclosure are directed to performing charge balancing of cells in a battery. Balancing cells of a battery allows the battery to last longer in cyclic charge/discharge situations, and reduces overall system cost by lengthening replacement cycle time.

As described above, batteries containing multiple cells are common in electric vehicle (EV) and smart-grid systems. Smart-grid systems may contain battery energy storage systems (BESS) to provide backup power during utility power loss, local storage to supply power at night for non-net-metering areas, and load-shifting services to save money in real time pricing scenarios. The costs of these systems are related to how long the battery lasts, since battery replacement can be a major contributing factor to the cost in such systems. Moreover, EVs use large battery storage systems for power. Increasing the energy that can be consumed with a single charge of the battery pack is key for manufacturers wishing to provide a vehicle with a competitive driving range.

Many batteries are made of a series of cells. For example, some batteries have ninety-six cells in series. In ideal systems, the cells remain in balance, and a set of cells have the same amp-hour capacity as an individual cell. But in practice, charge imbalance reduces the capacity of the assembled battery even if the individual cells retain their full capacity. In addition, imbalance can cause early aging and damage to the battery pack. Aspects of the present disclosure are directed to balancing of battery cells.

In a simple battery pack, the energy available from a battery pack may be limited by the cell containing the lowest charge. If cells become unbalanced such that some cells are near full charge while others are near zero charge, then the battery pack may become almost unusable, or inefficient. Any further charge provided to the battery cells may cause cells that are nearly-full of charge to become overcharged, and any further discharge of the battery cells may cause the nearly-empty cells to be discharged past a safe minimum charge point. Unbalanced battery packs thus tend to lose energy capacity and fail more quickly.

To increase the amount of energy that can be drawn from any battery pack, the cells of the battery pack may be balanced such that all cells have the same (or at least close to the same) charge state. This can be done once initially, such as when the battery pack is manufactured, or it can be done continuously, periodically, or intermittently during operation.

There are several methods that can be used to balance battery cells. For example, a shunt (top-balancing charge-depleting) system may be used to monitor battery voltage and add a shunt to dissipate power when the voltage nears a limit. This tends to reduce charge to the highest voltage cell to equalize the voltage on all cells with time. Another approach is to use a non-dissipative shunt, like an intentional top-balance (top-balancing charge-adding) system. For example, additional charge may be provided to each cell to bring all the cells to a specific voltage.

Low cell support (bottom-balancing charge-adding) systems may be used to add charge to cells that are nearing depletion during discharge. This charge may be provided from the battery pack output. Thus, the entire pack may be used to support the lowest cells so these cells are not over-discharged. Intentional bottom-balance (bottom-balancing charge-depleting) systems intentionally discharge all cells to the lowest safe voltage to ensure all cells are equally discharged before another charge cycle.

While this technique tends to cause all the battery cells to hit their lowest discharge point at the same time, the cells may not all hit their highest charge point concurrently. Voltage equalizing systems simply attempt to equalize the voltage on all cells. A "flying capacitor" system is one example, where a charge-shuttling capacitor is attached to each cell in turn, carrying charge from higher voltage cells to lower voltage cells. In most cases, it is common to also monitor each cell's voltage and terminate charging if the voltage of any cell is too high, and terminate discharging if the voltage of any cell is too low.

FIG. 1 illustrates a block diagram of an example battery cell balancing system 100, in accordance with certain aspects of the present disclosure. The system 100 may include a balancing bus 102 (e.g., a common power rail) which provides both a source of power to be provided to a series of battery cells 104 and a sink for power during discharge of the battery cells 104. The system 100 may include a balancing module 106 for each of the multiple battery cells 104. Each of the balancing modules 106 may include a transformer and support circuitry, connected to the balancing bus 102 which may be connected to a voltage source 108. The voltage source 108 can be the same as an accessory battery of an EV, which may provide about 12 volts. When a cell is overcharged, then power is transferred from the overcharged cell to the voltage source 108, and is then available for use by the vehicle's accessories. When a cell is undercharged, then power is transferred from the voltage source 108 to the undercharged cell in the series of battery cells 104 (also referred to as a "battery pack").

In some aspects, an auxiliary voltage supply 112 may be connected to the balancing bus 102 to provide extra power. The auxiliary voltage supply 112 may be a DC-DC converter that converts the total voltage of the battery pack to a voltage level (e.g., 12 volts) of the voltage source 108. In some aspects, a DC active load 110, which may be an accessory load for an EV, can be connected to the balancing bus 102 that can dissipate extra power to deal with overcharged cells. In some cases, another active load 114 may be coupled to the balancing bus 102 to dissipate extra power. In the case of a battery for a BESS, a similar system may be employed. For example, a small external voltage supply may provide startup power to the balancing bus 102, as well as power to circuitry used for monitoring of cell charge.

Figure 2:
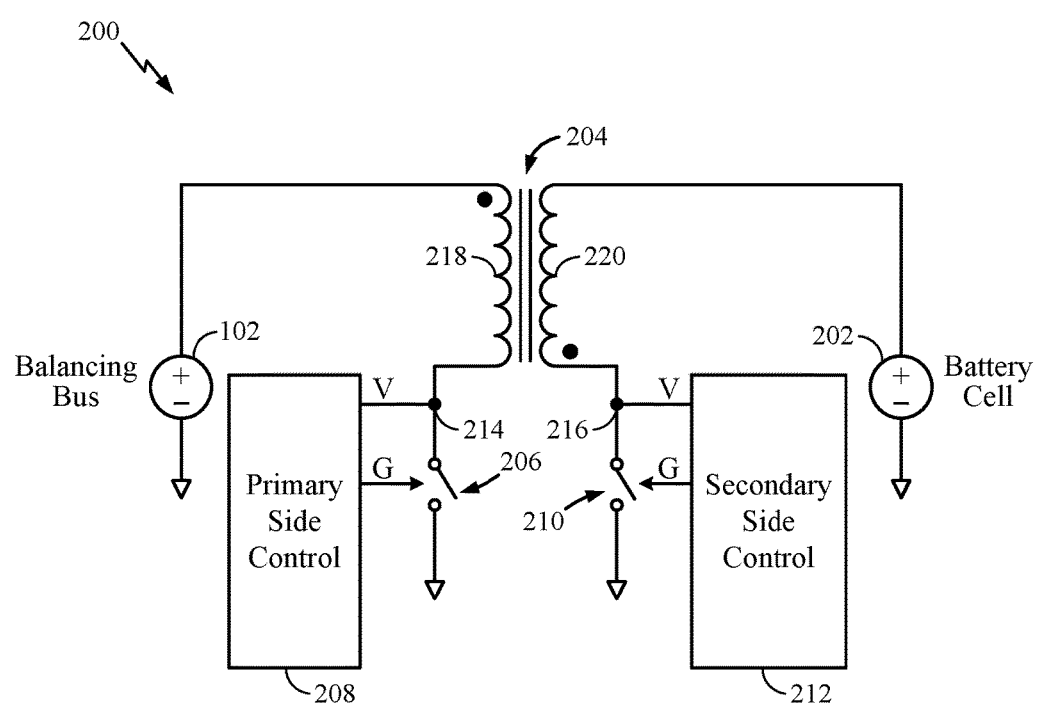
FIG. 2 illustrates an example balancing module including a flyback circuit, in accordance with certain aspects of the present disclosure.

FIG. 2 illustrates an example balancing module including a flyback circuit 200, in accordance with certain aspects of the present disclosure. The flyback circuit 200 transfers power between a battery cell 202 (modeled in FIG. 2 as a voltage source) and the balancing bus 102 (modeled in FIG. 2 as a voltage source). The battery cell 202 may correspond to one of the battery cells 104 of FIG. 1. During operation of the flyback circuit 200, energy is stored in the magnetic field of a transformer 204 and subsequently released. Thus, the size of the transformer 204 may be important because the energy that is transferred between the balancing bus 102 and the battery cell 202 is first stored in the transformer core's magnetic field. Therefore, with a larger transformer, more energy can be stored in the transformer 204, allowing for a more efficient transfer of power.

As illustrated, the primary winding 218 of the transformer 204 may be coupled to a switch 206 that may be operated by a primary side control circuit 208, and the secondary winding of the transformer 204 may be coupled to a switch 210 that may be operated by a secondary side control circuit 212. Thus, the control circuits 208 and 212 may control respective switches 206 and 210 to control the transfer of power between the balancing bus 102 and the cell 202.

Certain aspects of the present disclosure are directed to a technique for sensing voltage through the transformer 204 and using the sensed voltage to provide either a reference voltage or a feedback voltage for balancing of the battery cells. For example, the primary side control circuit 208 may sense a voltage at node 214, determine an estimated voltage of the cell 202, and control switch 206 based on the sensed voltage. Moreover, the secondary side control circuit 212 may sense a voltage at node 216, determine an estimated voltage of the balancing bus 102, and control switch 210 based on the sensed voltage. In certain aspects, the primary and secondary side control circuits 208 and 212 may use additional and/or alternative sensing schemes (e.g., current sense, or additional voltage sense points) to control respective switches 206 and 210.

Figure 3:
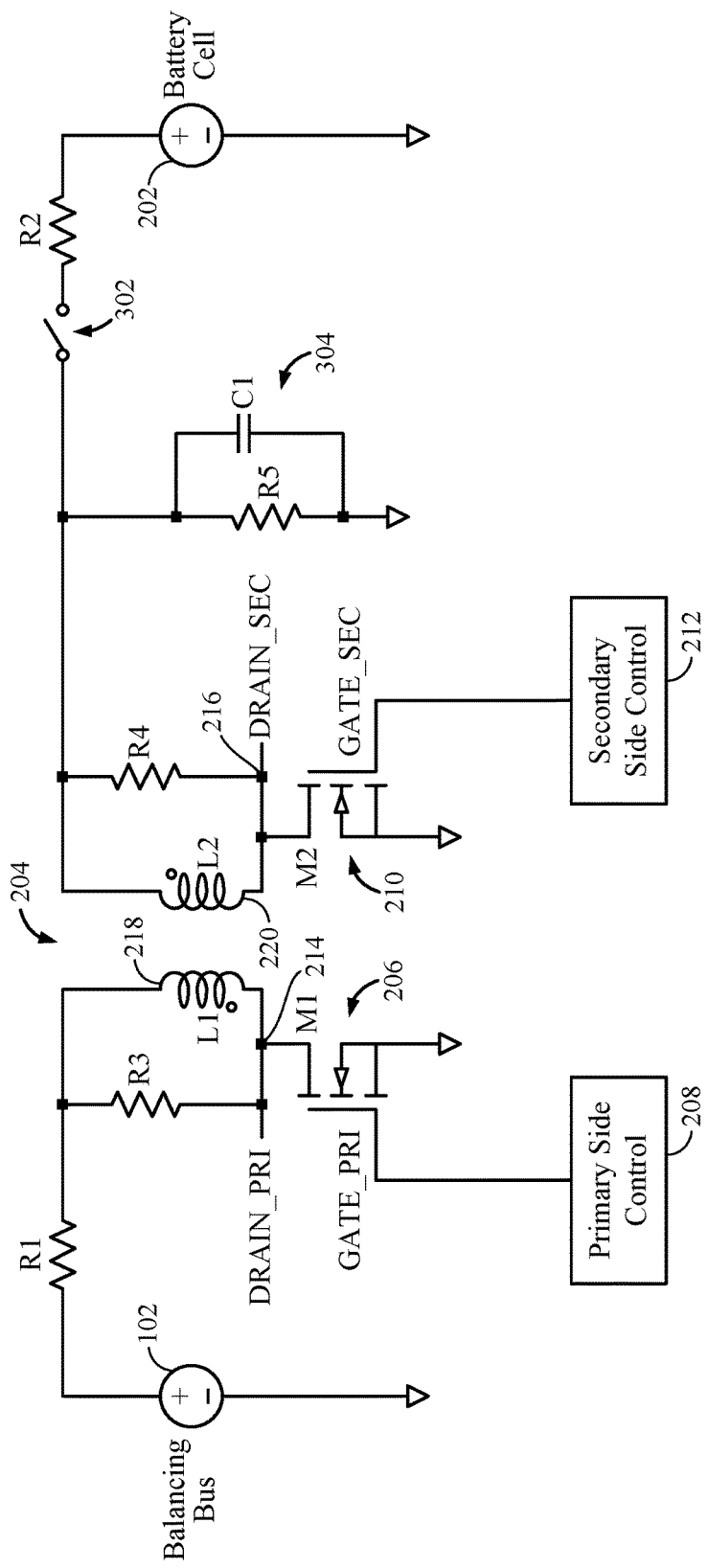
FIG. 3 illustrates an example balancing module including a flyback circuit coupled to a battery cell through a switch, in accordance with certain aspects of the present disclosure.

FIG. 3 illustrates an example balancing module including the flyback circuit 200 coupled to the battery cell 202 through a switch 302, in accordance with certain aspects of the present disclosure. The switches 206 and 210 may be implemented using any of various suitable components including a transistor, such as a metal-oxide semiconductor field-effect transistor (MOSFET) as illustrated in FIG. 3. The charging of the battery cell 202 is described with respect to two phases, hereinafter referred to as "a first charging phase" and "a second charging phase."

During the first charging phase, the switch 206 may be closed. While the switch 206 is closed, the transformer 204 couples power in the "forward" direction (e.g., from the primary winding side towards the secondary winding side). For example, power may be stored in the magnetic field of the transformer 204. The stored power may be used to provide a voltage reference on the secondary winding side of the transformer 204. That is, a voltage appears at the node 216, which may be the sum of the voltage of the battery cell 202 (e.g., 3 volts) and the voltage of the balancing bus 102 (e.g., 12 volts). Thus, the secondary side control circuit 212 can use this as a reference voltage. For example, the secondary side control circuit 212 may subtract the voltage of the battery cell 202, and thus, determine the voltage at the balancing bus 102.

During the second charging phase, the switch 206 may be opened, and the power stored in the magnetic field of the transformer 204 may be discharged. For example, this power may be used to power the secondary side control circuit 212 and/or provide power to charge the battery cell 202. That is, the control circuit 212 may close switch 302 in order to charge the battery cell 202. For example, if the switch 302 is closed, the power stored in the magnetic field of the transformer 204 may be transferred to the battery cell 202. Otherwise, the power stored in the magnetic field of the transformer 204 may be transferred into a load 304, such as a resistor-capacitor (RC) circuit. In certain aspects, the power in transferred to the load 304 may be used to power the secondary side control circuit 212. During the second charging phase, the switch 210 (e.g., a MOSFET) may be open (off) but the body diode of the MOSFET-implemented switch 210 may be conducting.

The discharging of the battery cell 202 is described with respect to two phases, hereinafter referred to as "a first discharging phase" and "a second discharging phase." During the first discharging phase, the switch 210 may be closed. While the switch 210 is closed, the transformer 204 transfers power from the battery cell 202 towards the primary winding side of the transformer 204 by storing the power from the battery cell 202 in the magnetic field of the transformer 204. The stored power may be used to provide a voltage reference on the primary side of the transformer 204. During this phase, a voltage appears at node 214 that may be the sum of the voltage of the battery cell 202 and the voltage of the balancing bus 102. Thus, the primary side control circuit 208 can use this voltage to monitor the battery cell voltage by subtracting the voltage of the balancing bus 102 from the voltage at the node 214.

During the second discharging phase, the switch 210 is opened, and power is discharged into the balancing bus 102. Thus, power is transferred from the battery cell 202 to the balancing bus 102. During this phase, the switch 206 (implemented with a MOSFET here) may be open (off), but the MOSFET's body diode may be conducting.

The timings of the first and second charging phases and the first and second discharging phases can be varied for charging and discharging of the battery cell 202. For example, by extending the duration of the first charging phase, more power may be transferred from the balancing bus 102 to the magnetic field of the transformer 204, and subsequently to the battery cell 202 during the second charging phase. By extending the duration of the first discharging phase, more power is transferred from the battery cell 202 to the magnetic field of the transformer 204, and subsequently to the balancing bus 102 during the second discharging phase.

In some aspects, a resistor R3 may be coupled across the primary winding 218, and a resistor R4 may be coupled across the secondary winding 220. The resistors R3 and R4 allow for discharge of the power stored in the magnetic field of the transformer 204 during steady state (e.g., when no power is being transferred between the balancing bus 102 and the cell 202).

Figure 4:
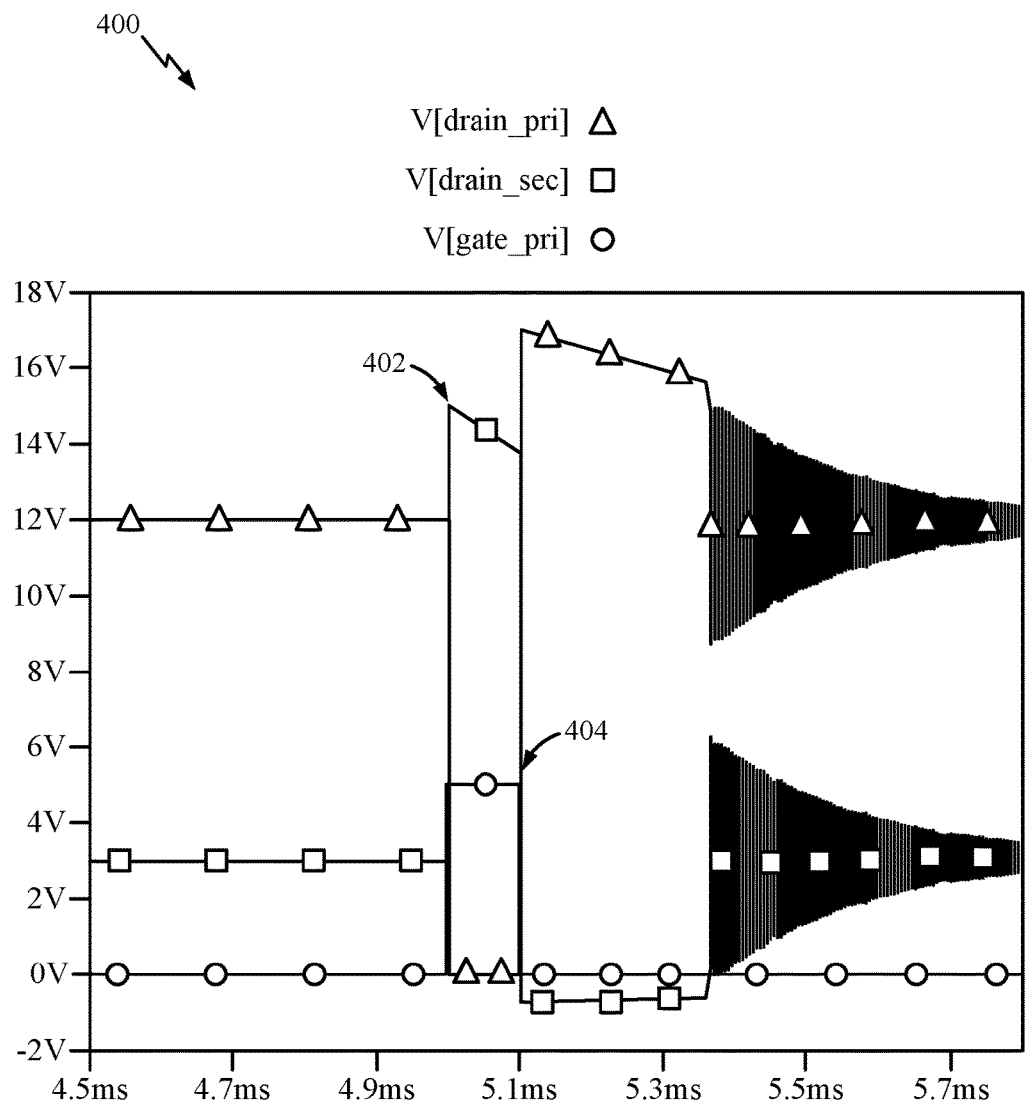
FIG. 4 is a graph illustrating example voltage levels of signals during charging phases of a flyback circuit, in accordance with certain aspects of the present disclosure.

FIG. 4 is a graph 400 illustrating example voltage levels of signals at a drain of switch 206 (Vdrain_pri), a drain of switch 210 (Vdrain_sec), and a gate of switch 206 (Vgate_pri) during the first and second charging phases, in accordance with certain aspects of the present disclosure. In this example, the voltage of the balancing bus 102 is 12 volts, and the voltage of the battery cell 202 is 3 volts. As illustrated, the gate of the primary side switch 206 is pulsed by the control circuit 208, and thus, switch 206 closes. At 402, there is 15 volts seen at node 214 (Vdrain_sec), which is the 12 volts of the balancing bus 102 plus the 3 volts across the battery cell 202. In certain aspects, a differential amplifier may be used to recover the 12 volts (e.g., by subtracting the 3 volt battery cell voltage) and use this recovered potential as a reference voltage. For example, once the 12 volts has been recovered, the 12 volts can be divided by 3.3 to obtain a reference voltage of 3.6 volts, which may be a good reference voltage for a battery cell, such as a lithium iron phosphate (LiFePO4) cell.

At 404, the primary side switch 206 is opened (e.g., gate voltage of switch 206 is removed), and the energy stored in the core of transformer 204 discharges into the cell 202 if the switch 302 is closed, or into the load 304 if the switch 302 is open. For example, during cell monitoring, this stored energy provides power for the control circuit 212, but during balancing, this power is transferred to the battery cell 202.

The wider the ON pulse of the gate voltage of switch 206 is, the more energy that is transferred to power the control circuit 212 or to charge the battery cell 202. Thus, at 404, the voltage at the node 214 (Vdrain_pri) rises to about 16 volts and subsequently decreases as the energy in the core is discharged, then rings after all the energy in the core has been discharged. The ringing may be due to the leakage inductance plus stray capacitance on the primary side of the transformer, which may be managed with snubbers and clamps.

Figure 5:
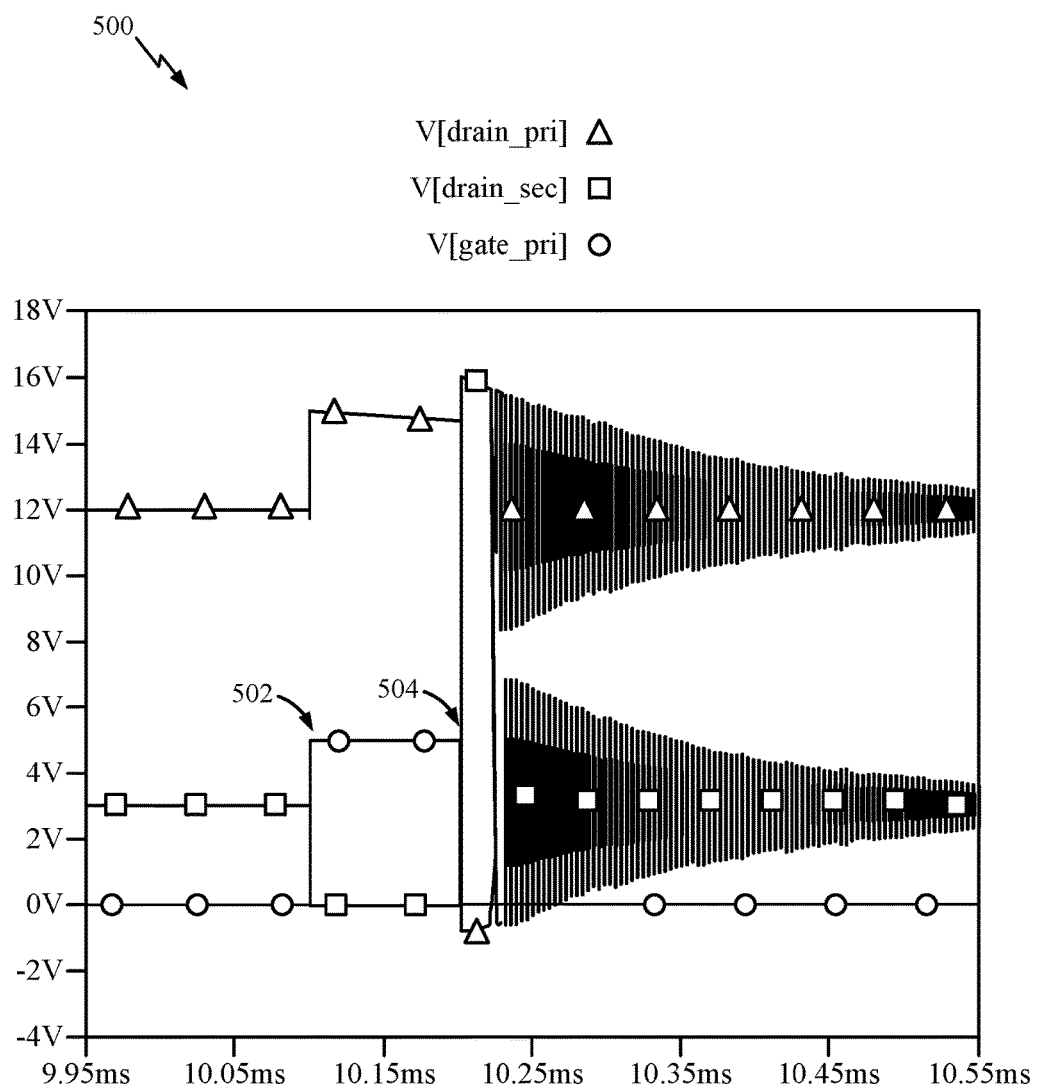
FIG. 5 is a graph illustrating example voltage levels of signals during discharging phases of a flyback circuit, in accordance with certain aspects of the present disclosure.

FIG. 5 is a graph 500 illustrating example voltage levels of signals at a drain of switch 206 (Vdrain_pri), a drain of switch 210 (Vdrain_sec), and a gate of switch 210 (Vgate_sec) during the first and second discharging phases, in accordance with certain aspects of the present disclosure. As illustrated, the gate of switch 210 is pulsed by a controller at 502, causing the switch 210 to close. Initially, there is 15 volts seen at the node 214 (Vdrain_pri), which is the 12 volts of the balancing bus plus the 3 volts of the battery cell 202. In certain aspects, a differential amplifier can be used to subtract the 12 volts of the balancing bus 102, and recover the battery cell voltage (e.g., 3 volts). The primary side control circuit 208 can then use that measurement, and in some aspects, along with other cell measurements, to determine whether to charge or discharge the battery cell 202.

Figure 6:
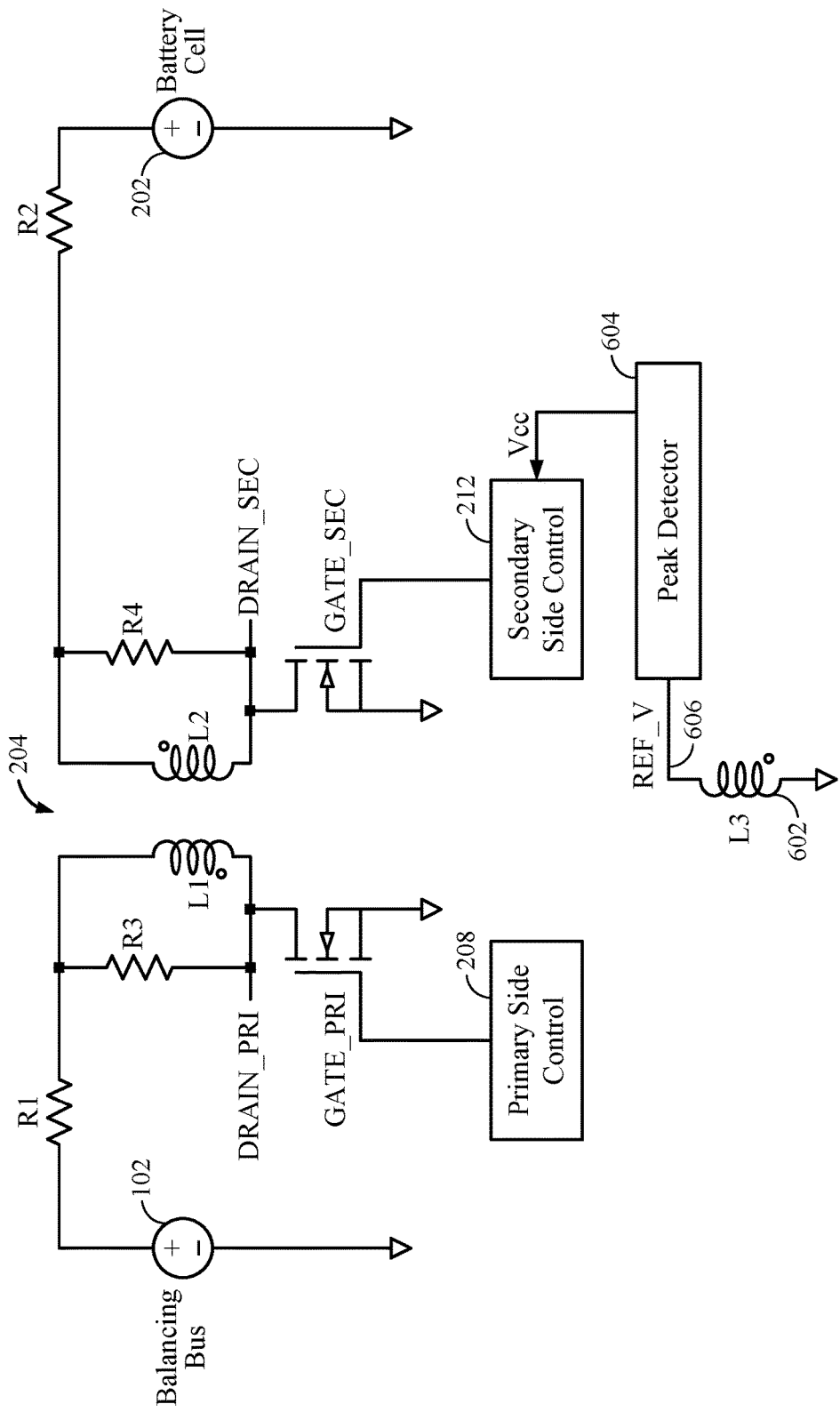
FIG. 6 illustrates an example balancing module including a flyback circuit implemented with a three winding transformer, in accordance with certain aspects of the present disclosure.

At 504, the switch 210 is opened, and the energy stored in the core of transformer 204 discharges into the bus 102. During simple cell monitoring, this may be little power due to a short duration of the first discharging phase. However, during balancing, the first discharging phase may be increased, and the amount of energy transferred from the cell 202 to the balancing bus 102 may be increased. The wider the ON pulse of the voltage at the gate of switch 210 (Vgate_sec) is, the more energy that is transferred. The voltage at node 216 (Vdrain_sec) decreases as the energy in the core of transformer 204 is discharged, then rings a little after all the energy in the core has been discharged. The ringing may be due to the leakage inductance plus stray capacitance on the primary side, which can be reduced with snubbers and clamps FIG. 6 illustrates an example balancing module including the flyback circuit 200 implemented with a three winding transformer, in accordance with certain aspects of the present disclosure. As illustrated, the transformer 204 may have another secondary winding 602 to capture power from the balancing bus 102 through the primary winding, to be used for operating power for the secondary side control circuit 212 and/or a reference voltage. For example, a peak detector 604 may be used to capture power from the transformer 204, and the output of the peak detector 604 may be used to power the control circuit 212.

Figure 7:
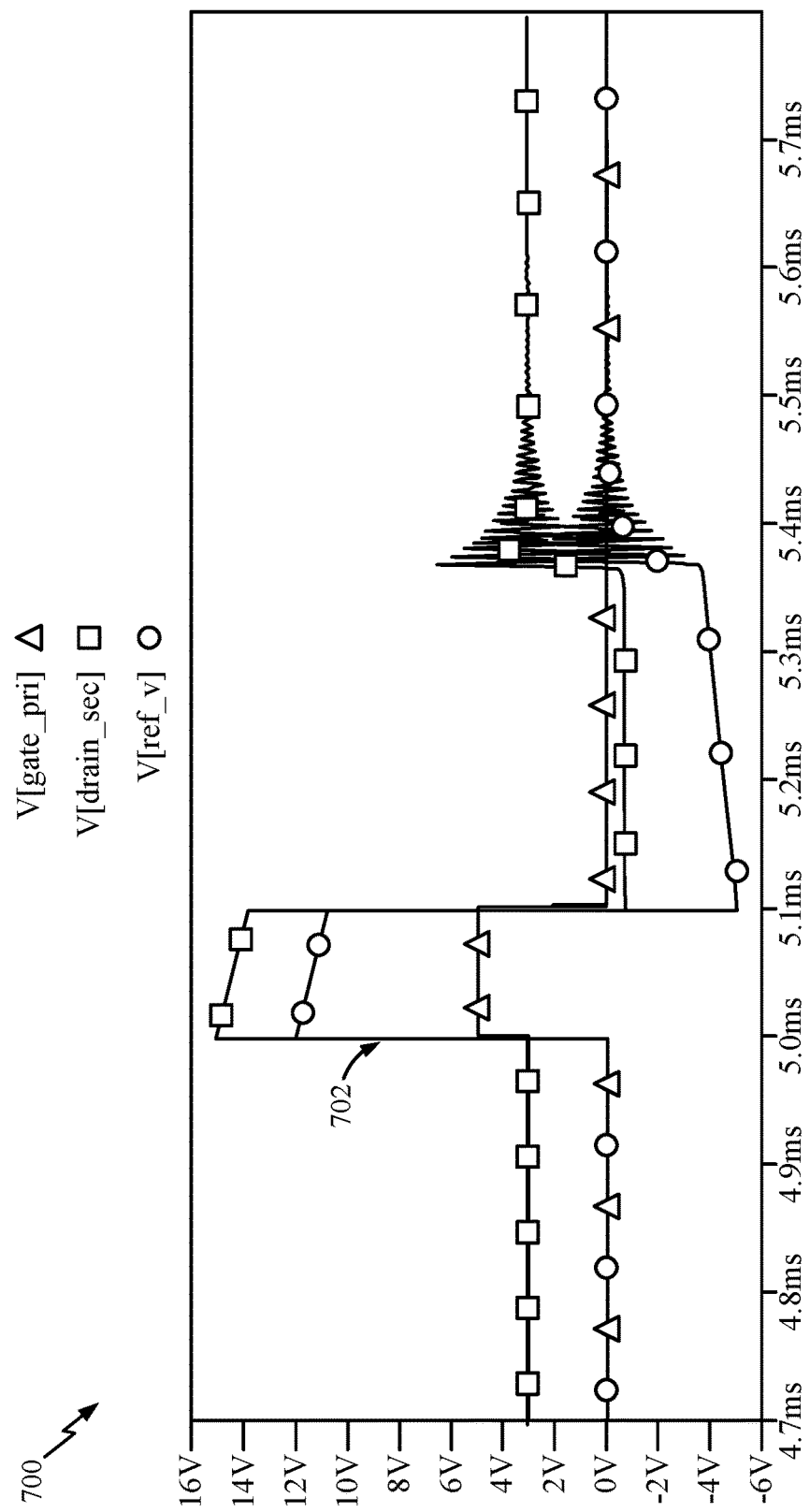
FIG. 7 is a graph illustrating example voltage levels of signals during charging phases of a flyback circuit implemented with a three winding transformer, in accordance with certain aspects of the present disclosure.

FIG. 7 is a graph 700 illustrating the voltage levels of signals at the drain of switch 210 (Vdrain_sec), the gate of switch 206 (Vgate_pri), and node 606 (REF_V) during the first and second charging phases, in accordance with certain aspects of the present disclosure. At 702, the switch 206 is closed, at which point, a pulse at node 606 (REF_V) indicates the voltage of the balancing bus (e.g., 12 volts). This can be detected and used as a reference without the use of a differential amplifier. For example, the peak detector circuit 604 can be used to capture power from the secondary winding 602 and provide power to the control circuit 212 without using any power from the battery cell 202.

Figure 8:
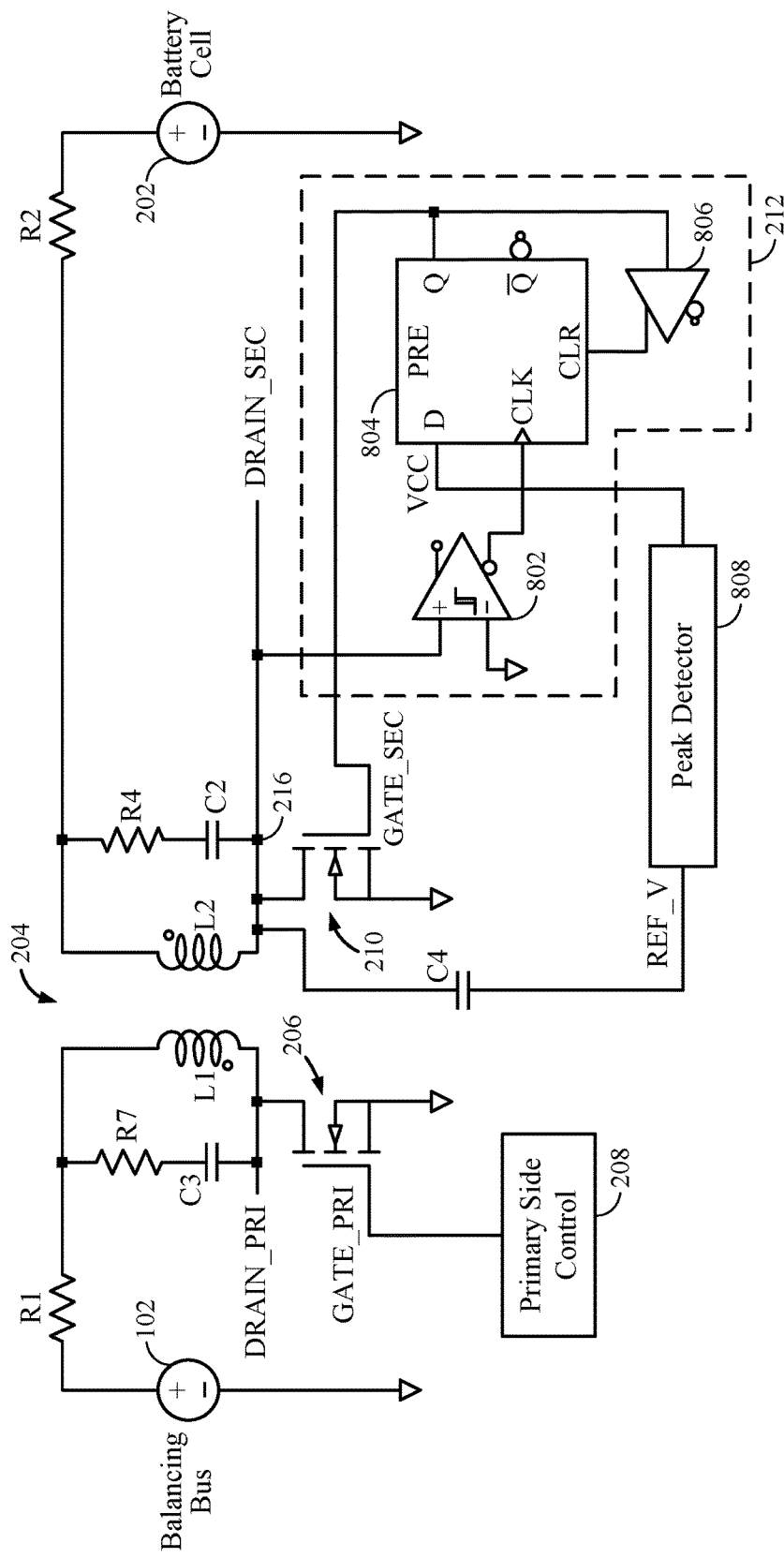
FIG. 8 illustrates an example balancing module including a flyback circuit and a control circuit for the balancing module, in accordance with certain aspects of the present disclosure.

FIG. 8 illustrates an example balancing module including the flyback circuit 200 and an example implementation of the secondary side control circuit 212, in accordance with certain aspects of the present disclosure. As illustrated, a latch 802 may be used to detect the change in voltage at node 216 on the secondary winding of transformer 204. In some aspects, the latch 802 may control a flip-flop 804 (e.g., D flip-flop) to close the switch 210 after detecting that the switch 206 has opened.

Initially, closing switch 210 allows current to pass between the drain and source terminals of switch 210, just as the body diode of switch 210 did when the switch 210 was open. However, the flip-flop 804 may be coupled to an adjustable delay element 806, which may be adjusted according to the voltage observed on the battery cell 202. As the battery voltage rises, the delay of the delay element 806 becomes longer. At some point, the switch 210 remains closed long enough to completely reset the core of transformer 204, resulting in conduction of power toward the balancing bus, discharging the battery cell. As the voltage at the battery cell 202 rises, the switch 210 is kept closed for longer and longer, causing more power to be withdrawn from the battery cell, effectively working to balance the battery cell voltage and the balancing bus voltage.

In some aspects, a peak detector circuit 808 may be used to power the control circuit 212 (e.g., flip-flop 804), as illustrated. The peak detector circuit 808 may be coupled to node 216, through an alternating-current (AC) coupling capacitor C4, for example.

With the flyback circuit, different turns ratios between the primary and secondary windings of the transformer 204 may be used, such as a 1:1 turns ratio. However, matching the turns ratio with the voltage ratio between balancing bus 102 and cell 202 can improve efficiency and make timing more predictable. For example, where the balancing bus voltage is 12 volts, and the battery cell voltage is 3 volts, a turns ratio of 4:1 may be used.

Aspects of the present disclosure allow for little to no power consumption when the balancing supply is removed. This prevents discharge of the battery by the balancing circuit when the battery is simply storing charge and battery cell balancing operations are not active. Aspects of the present disclosure also prevent differing parasitic drain currents from discharging, and thus, unbalancing battery cells over time.

Transformers are typically one of the most expensive and largest components in the design of a balancing circuit. Thus, by only using a single transformer for each battery cell, having in some aspects only two windings, cost will be reduced and reliability improved.

Since the balancing modules for each of the battery cells may see the same reference voltage on the balancing bus, the balancing modules may balance their respective battery cells to the same voltage. Moreover, aspects of the present disclosure can provide a low voltage for accessory loads since the balancing modules can be used to withdraw charge from the battery cells. Depending on implementation of control devices, this system can be capable of top or bottom balancing, charge adding or depleting, and voltage equalizing functions.

In many cases the primary side (and in some cases the secondary side) of the transformers may contain small, inexpensive complex programmable logic devices (CPLD's), field-programmable gate-arrays (FPGA's), processors or other logic that allows more sophisticated operation. For example, decisions on when to charge or discharge can be made based on the voltage level of the balancing bus. If the voltage is too high, then charge becomes favored over discharge, causing the voltage of the balancing bus to drop. If the voltage is too low, then discharge becomes favored over charge, causing the voltage of the balancing bus to rise.

Figure 9:
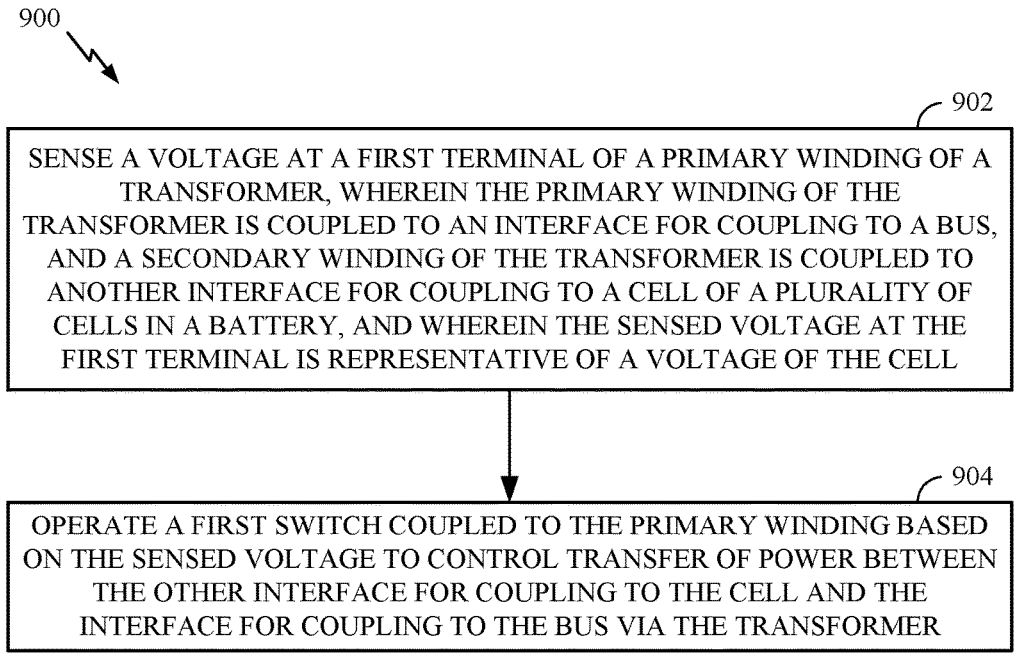
FIG. 9 is a flow diagram of example operations for balancing charge in a plurality of cells in a battery via a primary side control circuit, in accordance with certain aspects of the present disclosure.

FIG. 9 is a flow diagram of example operations 900 for balancing charge in a plurality of cells in a battery, in accordance with certain aspects of the present disclosure. The operations 900 may be performed by a circuit, such as the circuits of FIG. 2, FIG. 3, FIG. 6, and FIG. 8.

The operations 900 may begin, at block 902, by sensing a voltage at a first terminal of a primary winding of a transformer, wherein the primary winding of the transformer is coupled to an interface for coupling to a bus, wherein a secondary winding of the transformer is coupled to another interface for coupling to a cell of the plurality of cells in the battery, and wherein the sensed voltage at the first terminal is representative of a voltage of the cell. At block 904, the operations 900 continue by operating a first switch coupled to the primary winding based on the sensed voltage to control transfer of power between the other interface for coupling to the cell and the interface for coupling to the bus via the transformer.

In some aspects, the operations 900 also include sensing a voltage at a first terminal of the secondary winding, wherein the sensed voltage at the first terminal of the secondary winding is representative of a voltage of the bus. In this case, a second switch coupled to the secondary winding may be operated based on the sensed voltage at the first terminal of the secondary winding to control transfer of power between the other interface for coupling to the cell and the interface for coupling to the bus via the transformer. In some cases, the operations 900 include closing the first switch during a first phase to transfer power from the bus to be stored in the magnetic field of the transformer. In this case, the voltage at the first terminal of the secondary winding is generated after the first switch is closed, and the sensing of the voltage at the first terminal of the secondary winding is performed during the first phase.

In some cases, the operations 900 also include opening the first switch during a second phase to transfer power stored in the magnetic field of the transformer to the cell. In this case, the operations 900 include determining when the first switch is opened during the second phase by sensing the voltage at the first terminal of the secondary winding, and closing the second switch based on the determination. In some aspects, an amount of time the second switch remains closed depends on the voltage of the cell. In certain aspects, a third switch may be operated, wherein the secondary winding is coupled to the other interface through the third switch, and wherein the power stored in the magnetic field of the transformer is transferred to the cell when the third switch is closed. In certain aspects, the power stored in the magnetic field of the transformer is transferred to a load when the third switch is open.

In certain aspects, the second switch may be closed during a first phase to transfer power from the cell to be stored in the magnetic field of the transformer. In this case, the voltage at the first terminal of the primary winding is generated after the second switch is closed, and sensing the voltage at the first terminal of the primary winding is performed during the first phase. In this case, the first switch may be opened during the second phase to transfer the power stored in the magnetic field of the transformer to the bus. In certain aspects, the first switch may be coupled to the first terminal of the primary winding and a second terminal of the primary winding may be coupled to the interface. In some cases, a turns ratio of the transformer may be determined based on a ratio between a nominal voltage of the bus and a nominal voltage of the cell.

Figure 10:
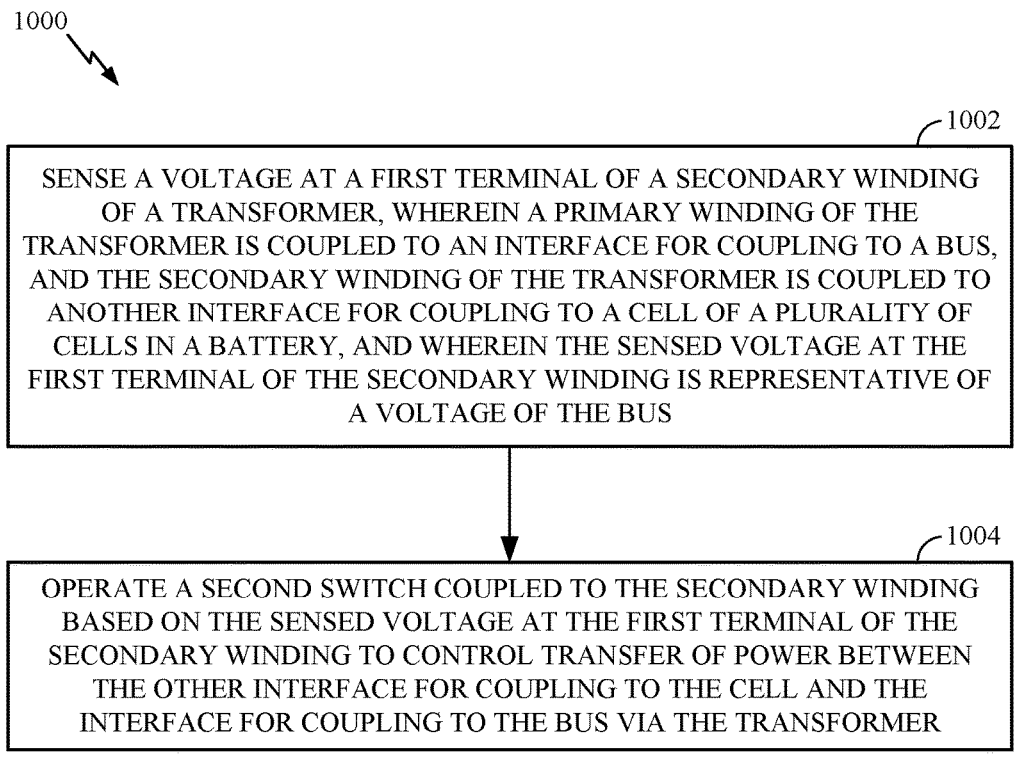
FIG. 10 is a flow diagram of example operations for balancing charge in a plurality of cells in a battery via a secondary side control circuit, in accordance with certain aspects of the present disclosure.

FIG. 10 is a flow diagram of example operations 1000 for balancing charge in a plurality of cells in a battery, in accordance with certain aspects of the present disclosure. The operations 1000 may be performed by a circuit, such as the circuits of FIG. 2, FIG. 3, FIG. 6, and FIG. 8.

The operations 1000 may begin, at block 1002, by sensing a voltage at a first terminal of a secondary winding of a transformer, wherein a primary winding of the transformer is coupled to an interface for coupling to a bus, and the secondary winding of the transformer is coupled to another interface for coupling to a cell of the plurality of cells in the battery, and wherein the sensed voltage at the first terminal of the secondary winding is representative of a voltage of the bus. At block 1004, the operations 1000 continue by operating a second switch coupled to the secondary winding based on the sensed voltage at the first terminal of the secondary winding to control transfer of power between the other interface for coupling to the cell and the interface for coupling to the bus via the transformer.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

For example, means for sensing, means for operating, means for determining, means for deactivating, means for opening, and means for closing may include a circuit, such as the control circuits 208 and 212 of FIGS. 2, 3, 6, 8.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for balancing charge in a plurality of cells in a battery, comprising:
    a transformer comprising a primary winding and a secondary winding, the primary winding of the transformer being coupled to an interface for coupling to a bus, and the secondary winding being coupled to another interface for coupling to a cell of the plurality of cells in the battery;
    a first switch coupled to the primary winding of the transformer; and
    one or more control circuits coupled to the first switch and configured to control the first switch based on a voltage at a first terminal of the primary winding to control transfer of power between the other interface for coupling to the cell and the interface for coupling to the bus via the transformer.

2. The apparatus of claim 1, wherein the one or more control circuits are further configured to sense the voltage at the first terminal of the primary winding, wherein the sensed voltage at the first terminal of the primary winding is representative of a voltage of the cell.

3. The apparatus of claim 1, further comprising a second switch coupled to the secondary winding of the transformer, wherein at least one of the one or more control circuits is configured to control the second switch based on a voltage at a first terminal of the secondary winding to control transfer of power between the other interface for coupling to the cell and the interface for coupling to the bus via the transformer.

4. The apparatus of claim 3, wherein the at least one control circuit is configured to sense the voltage at the first terminal of the secondary winding, wherein the sensed voltage at the first terminal of the secondary winding is representative of a voltage of the bus.

5. The apparatus of claim 3, wherein the one or more control circuits are further configured to:
close the first switch during a first phase to transfer power from the bus to be stored in a magnetic field of the transformer; and
generate the voltage at the first terminal of the secondary winding, wherein the at least one control circuit is configured to sense the voltage at the first terminal of the secondary winding during the first phase.

6. The apparatus of claim 5, wherein the one or more control circuits are further configured to open the first switch during a second phase to transfer power stored in the magnetic field of the transformer to the cell.

7. The apparatus of claim 6, wherein the at least one control circuit comprises a latch configured to determine when the first switch is opened during the second phase by sensing the voltage at the first terminal of the secondary winding, wherein the at least one control circuit is configured to close the second switch based on the determination.

8. The apparatus of claim 7, wherein an amount of time the second switch remains closed depends on the voltage of the cell.

9. The apparatus of claim 6, wherein the secondary winding is coupled to the other interface through a third switch, and wherein the power stored in the magnetic field of the transformer is transferred to the cell when the third switch is closed.

10. The apparatus of claim 9, further comprising a resistor-capacitor (RC) circuit coupled to the secondary winding, wherein the power stored in the magnetic field of the transformer is transferred to the RC circuit when the third switch is open.

11. The apparatus of claim 9, wherein the power stored in the magnetic field of the transformer is used to power the at least one control circuit when the third switch is open.

12. The apparatus of claim 3, wherein the at least one control circuit is further configured to:
close the second switch during a first phase to transfer power from the cell to be stored in a magnetic field of the transformer; and
generate the voltage at the first terminal of the primary winding, wherein the one or more control circuits are configured to sense the voltage at the first terminal of the primary winding during the first phase.

13. The apparatus of claim 12, wherein the at least one control circuit is configured to open the first switch during the second phase to transfer the power stored in the magnetic field of the transformer to the bus.

14. The apparatus of claim 1, wherein the first switch is coupled to the first terminal of the primary winding and wherein a second terminal of the primary winding is coupled to the interface.

15. The apparatus of claim 1, wherein a turns ratio of the transformer is determined based on a ratio between a nominal voltage of the bus and a nominal voltage of the cell.

16. A method for balancing charge in a plurality of cells in a battery, comprising:
sensing a voltage at a first terminal of a primary winding of a transformer, wherein:
the primary winding of the transformer is coupled to an interface for coupling to a bus;
a secondary winding of the transformer is coupled to another interface for coupling to a cell of the plurality of cells in the battery; and
the sensed voltage at the first terminal is representative of a voltage of the cell; and
operating a first switch coupled to the primary winding based on the sensed voltage to control transfer of power between the other interface for coupling to the cell and the interface for coupling to the bus via the transformer.

17. The method of claim 16, further comprising:
sensing a voltage at a first terminal of the secondary winding, wherein the sensed voltage at the first terminal of the secondary winding is representative of a voltage of the bus; and
operating a second switch coupled to the secondary winding based on the sensed voltage at the first terminal of the secondary winding to control transfer of power between the other interface for coupling to the cell and the interface for coupling to the bus via the transformer.

18. The method of claim 17, further comprising:
closing the first switch during a first phase to transfer power from the bus to be stored in a magnetic field of the transformer, wherein:
the voltage at the first terminal of the secondary winding is generated after the first switch is closed; and
the sensing of the voltage at the first terminal of the secondary winding is performed during the first phase.

19. The method of claim 18, further comprising opening the first switch during a second phase to transfer power stored in the magnetic field of the transformer to the cell.

20. The method of claim 19, further comprising:
determining when the first switch is opened during the second phase by sensing the voltage at the first terminal of the secondary winding; and
closing the second switch based on the determination.

21. The method of claim 20, further comprising operating a third switch, wherein the secondary winding is coupled to the other interface through the third switch, and wherein the power stored in the magnetic field of the transformer is transferred to the cell when the third switch is closed.

22. The method of claim 17, further comprising:
closing the second switch during a first phase to transfer power from the cell to be stored in a magnetic field of the transformer, wherein:
the voltage at the first terminal of the primary winding is generated after the second switch is closed; and
sensing the voltage at the first terminal of the primary winding is performed during the first phase.

23. The method of claim 22, further comprising opening the first switch during the second phase to transfer the power stored in the magnetic field of the transformer to the bus.

24. The method of claim 16, wherein a turns ratio of the transformer is determined based on a ratio between a nominal voltage of the bus and a nominal voltage of the cell.

25. An apparatus for balancing charge in a plurality of cells in a battery, comprising:
- a transformer comprising a primary winding and a secondary winding, the primary winding of the transformer being coupled to an interface for coupling to a bus, and the secondary winding being coupled to another interface for coupling to a cell of the plurality of cells in the battery;
- a first switch coupled to the secondary winding of the transformer; and
- a control circuit configured to:
    - sense a voltage at a first terminal of the secondary winding representative of a voltage of the bus; and
    - control the first switch based on the sensed voltage at the first terminal of the secondary winding to control transfer of power between the other interface for coupling to the cell and the interface for coupling to the bus via the transformer.

26. A system for balancing charge in a plurality of cells in a battery, comprising:
- a plurality of transformers, each comprising a primary winding and a secondary winding, wherein each of the primary windings is coupled to an interface for coupling to a bus, and wherein each of the secondary windings is coupled to another interface for coupling to one of the plurality of cells;
- a plurality of switches, wherein each of the primary windings is coupled to one of the plurality of switches; and
- at least one control circuit coupled to the plurality of switches and configured to control the plurality of switches based on one or more voltages at a first terminal of the primary windings to control transfer of power between the other interfaces for coupling to the plurality of cells and the interfaces for coupling to the bus.

27. The system of claim 26, wherein the one or more voltages are representative of a voltage of a respective cell of the plurality of cells.

28. The system of claim 27, wherein the at least one control circuit is further configured to sense the one or more voltages at the first terminal.

* * * * *